(12) United States Patent
Gurumurthy (10) Patent No.: US 7,710,972 B2
(45) Date of Patent: May 4, 2010

(54) DISCRETE TABLE DESCRIPTOR FOR UNIFIED TABLE MANAGEMENT

(75) Inventor: Rajaram Gurumurthy, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 553 days.

(21) Appl. No.: 11/644,220

(22) Filed: Dec. 21, 2006

(65) Prior Publication Data

US 2008/0155206 A1   Jun. 26, 2008

(51) Int. Cl.
*H04L 12/28* (2006.01)
(52) U.S. Cl. ...................................................... 370/392
(58) Field of Classification Search .................. 370/392; 715/255
See application file for complete search history.

(56) References Cited

U.S. PATENT DOCUMENTS

| 4,841,292 | A  | * | 6/1989 | Zeno .......................... 345/419 |
| 5,280,575 | A  | * | 1/1994 | Young et al. ................. 715/255 |
| 5,918,225 | A  | * | 6/1999 | White et al. ..................... 707/3 |
| 6,839,823 | B1 | * | 1/2005 | See et al. ...................... 711/171 |
| 7,200,144 | B2 | * | 4/2007 | Terrell et al. ................. 370/389 |
| 7,254,703 | B2 | * | 8/2007 | Rydman ........................ 713/2 |
| 7,317,721 | B1 | * | 1/2008 | Sindhu et al. ............... 370/389 |
| 2007/0180532 | A1 | * | 8/2007 | Cha et al. ...................... 726/25 |

\* cited by examiner

*Primary Examiner*—Ayaz R Sheikh
*Assistant Examiner*—Hai-Chang Hsiung
(74) *Attorney, Agent, or Firm*—Blakely, Sokoloff, Taylor & Zafman LLP (57) ABSTRACT

A table descriptor is associated with a table and referenced to provide access to the table. The table descriptor includes a first portion identifying information about the table and a second portion identifying one or more locations of the table in memory.

17 Claims, 8 Drawing Sheets

ROUTING TABLE 300A

| | DESTINATION ADDRESS | ADDRESS MASK | NEXT-HOP ADDRESS | INTERFACE NUMBER |
|---|---|---|---|---|
| | TABLE FIELD 1 | TABLE FIELD 2 | TABLE FIELD 3 | TABLE FIELD 4 |
| ENTRY 1: | 180.5.32.0 | 255.255.255.0 | 128.234.30.5 | 4 |
| ENTRY 2: | 132.50.0.0 | 255.255.0.0 | 128.234.141.12 | 1 |
| ENTRY 3: | ... | ... | ... | ... |
| ENTRY N: | 0.0.0.0 | 0.0.0.0 | 128.201.30.5 | 3 |

FIG. 3A

5-TUPLE CLASSIFICATION TABLE FOR IPV4   300B

| | SOURCE ADDRS | DEST ADDRS | DEST PORT | SOURCE PORT | PROTOCOL FIELD | FLOW ID |
|---|---|---|---|---|---|---|
| | TABLE FIELD 1 | TABLE FIELD 2 | TABLE FIELD 3 | TABLE FIELD 4 | TABLE FIELD 5 | TABLE FIELD 6 |
| ENTRY 1: | ADDRS 1 | ADDRS 1 | PORT 1 | PORT 1 | PROTO 1 | FLOW 1 |
| ENTRY 2: | ADDRS 2 | ADDRS 2 | PORT 2 | PORT 2 | PROTO 2 | FLOW 2 |
| ENTRY 3: | ADDRS 3 | ADDRS 3 | PORT 3 | PORT 3 | PROTO 3 | FLOW 3 |
| ENTRY N: | ADDRS N | ADDRS N | PORT N | PORT N | PROTO N | FLOW N |

| NUMBER OF DIST. | NUMBER OF PART. | REMARKS | INTERPRETATION OF COLUMNS IN FIG. 4 |
|---|---|---|---|
| VALUE = 1 | VALUE = 1 | TABLE PRESENT IN ONLY ONE TYPE OF MEMORY, ORGANIZED CONTINUOUSLY | ONLY ONE MEM TYPE FROM COL 6; ONLY ONE START ADDR FROM COL 7; ONLY ONE NUM ENTRIES FROM COL 8 |
| VALUE = 1 | VALUE > 1 | TABLE PRESENT IN ONLY ONE TYPE OF MEMORY, BUT ORGANIZED DISCONTINUOUSLY | ONLY ONE MEM TYPE FROM COL 6; MULTIPLE START ADDR (EQUAL TO THE NUMBER OF PARTITIONS IN COL 5) FROM COL 7; MULTIPLE NUM ENTRIES (EQUAL TO THE NUMBER OF START ADDR) FROM COL 8 (WITH ONE-TO-ONE CORRESPONDENCE TO COL 7) |
| VALUE > 1 | VALUE = 1 | TABLE DISTRIBUTED ACROSS DIFFERENT MEMORIES, BUT IN EACH MEMORY THE PORTIONS OF THE TABLE WILL BE ORGANIZED IN A CONTINUOUS FASHION | MULTIPLE MEM TYPE (EQUAL TO NUMBER OF DISTRIBUTIONS) FROM COL 6; FOR EACH MEM TYPE IN COL 6, THERE WILL BE A CORRESPONDING STARTING ADDRESS IN COL 7; THERE WILL BE A CORRESPONDING NUM ENTRIES IN COL 8 FOR EACH STARTING ADDRESS |
| VALUE > 1 | VALUE > 1 | SPECIAL CASE. WHEN THE NUMBER OF DISTRIBUTIONS & NUMBER OF PARTITIONS ARE > 1, THE TABLE IS DISTRIBUTED ACROSS DIFFERENT MEMORIES, AND THE PORTIONS OF THE TABLE IN AT LEAST ONE TYPE OF MEMORY IS DISCONTINUOUSLY ORGANIZED | MULTIPLE MEM TYPE (EQUAL TO NUMBER OF DISTRIBUTIONS) FROM COL 6; FOR EACH MEM TYPE IN COL 6, THERE WILL BE A CORRESPONDING NUMBER OF PARTITIONS IN COL 9; VALUE OF NUMBER OF PARTITIONS IN COL 5 IS USED TO INTERPRET SPECIAL CASE; COL 9 WILL HAVE THE LIST OF NUMBER OF PARTITIONS FOR EACH MEM TYPE IN COL 6<br><br>FOR EACH NUMBER OF PARTITIONS IN COL 9, THERE WILL BE CORRESPONDING NUMBER OF STARTING ADDRESSES IN COL 7, AND THERE WILL BE A CORRESPONDING NUMBER ENTRIES IN COL 8 FOR THESE STARTING ADDRESSES; TOTAL NUMBER OF STARTING ADDRESSES & NUMBER OF ENTRIES WILL EQUAL THE SUM OF ALL NUMBER OF PARTITIONS IN COL 9 |

FIG. 7

DISCRETE TABLE DESCRIPTOR FOR UNIFIED TABLE MANAGEMENT

TECHNICAL FIELD

This disclosure relates generally to table management, and in particular but not exclusively, relates to a table descriptor for lookup table management.

BACKGROUND INFORMATION

Modern packet switching networks are used to carry a variety of different types of information for a wide variety of users and applications. As the use of packet based networks and the diversity of applications to be supported is increasing, support for advanced networking services such as Service Level Agreement ("SLA") monitoring, traffic engineering, security, billing and the like, to name a few, is becoming a requirement.

One technique for implementing these advanced network services is to classify packets transported within the network into flows and assign actions to be taken on the packets based on the flow assignment. Based on the flow assignment, the network may ensure all packets of this flow receive the appropriate priority and reserve the necessary bandwidth along the path to the destination. The criteria for classification into flows may be diverse; it may include information from the header of a packet, some part of the packet payload or other information such as the ingress or egress interface associated with the packet. This criteria for classification is specified in the form of classification rules. Any packet matching the criteria specified in a classification rule will be classified into the same flow.

In conventional network processor unit ("NPU"), the diverse set of classification rules may be stored in a number of lookup tables. These lookup tables are indexed into by the classification engine to determine the flow to which an incoming packet should be assigned. Since packet classification is executed in real-time at line rates, these lookup tables are often maintained in expensive, high speed, low latency memory (e.g., SRAM), which is a finite and valuable resource.

Lookup tables may also be used to implement other functionality within a NPU, such as Internet Protocol ("IP") forwarding to route a packet from its source to its destination. EP forwarding is a layer three operation that uses IP addresses to make forwarding decisions. The NPU indexes into a routing table stored in a lookup table using the destination IP address within the packet (or datagram) as the index key. The IP forwarding decision chooses the next hop IP address as well as an output port of the router through which the next hop may be reached. Conceptually, a routing table contains an entry for each possible destination along with a next hop used to reach the destination.

Conventional lookup tables are established by pre-allocating a contiguous block of memory and populating the memory with entries of the lookup table. The amount of memory pre-allocated is generally determined based on an estimate of the maximum foreseeable number of entries. Even if only a fraction of the maximum number of entries is actually used, the entire block of pre-allocated memory remains reserved, resulting in wasteful consumption of a valuable resource.

Since each lookup table in an NPU may be designed for a unique purpose (e.g., classification, IP forwarding, database access, etc.), each lookup table can have a unique format and its own set of management/access functions (also referred to as application program interfaces ("APIs")) developed by the table designer. Although the various APIs for the lookup tables may execute the same or similar table functions, each lookup table has its own set of APIs due to non-unified formats of the various lookup tables. These redundant APIs are stored in memory and consume valuable memory resources, as well.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 7 illustrates a table that summarizes possible values within descriptor fields of a DTD and their respective interpretations, according to one embodiment of the invention.

DETAILED DESCRIPTION

Embodiments of a system and method for a discrete table descriptor are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
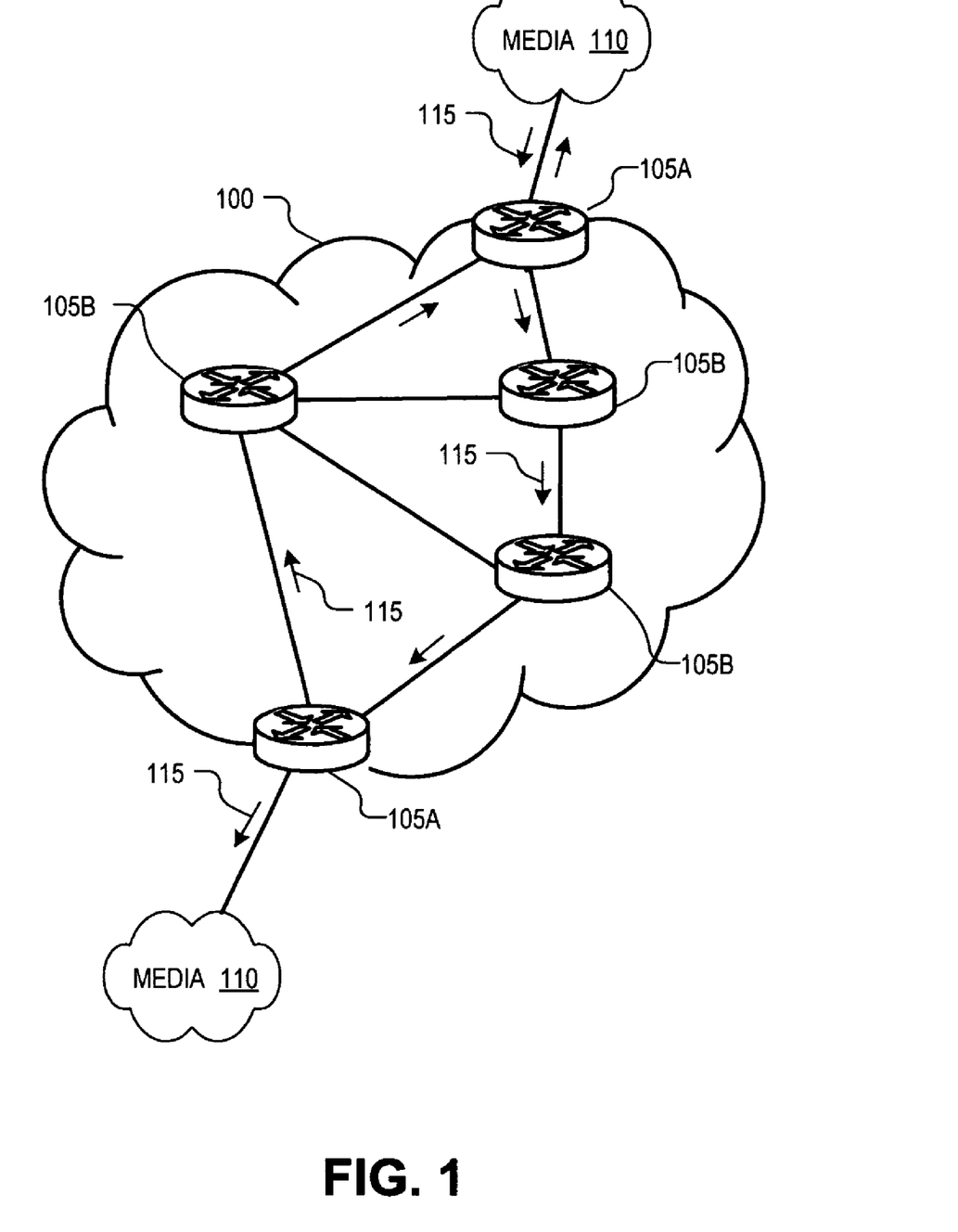
FIG. 1 is a block diagram illustrating a network including network nodes implementing packet classification and Internet Protocol ("IP") forwarding, in accordance with an embodiment of the invention.

FIG. 1 is a block diagram illustrating a network 100 including network nodes 105 implementing packet classification and Internet Protocol ("IP") forwarding, in accordance with an embodiment of the invention. The illustrated embodiment of network 100 includes network nodes 105A and 105B (collectively 105) coupled together to transport packets across network 100. Network nodes 105A are referred to as edge nodes and are coupled to external media 110 (e.g., external networks, computers, etc.), while network nodes 105B are internal nodes and may be coupled to other internal nodes 105B and/or edge nodes 105A. As packets 115 (only a portion of which are labeled) arrive at network nodes 105, packets 115 are classified into flows and forwarded to the next hop along their journey to their destination.

Classifying packets 115 into flows can aid hardware and/or software of network nodes 105 to implement a number of advanced network services including: service level agreement ("SLA") monitoring, traffic engineering, security, billing tracking, quality of service ("QoS"), generating and maintaining statistical data, and the like. Forwarding packets 115 (also referred to as Internet Packet ("IP") forwarding) effectuates routing packets 115 from their source node to their destination node. Both of these tasks (classification and IP forwarding) may be implemented with reference to one or more lookup tables.

Figure 2:
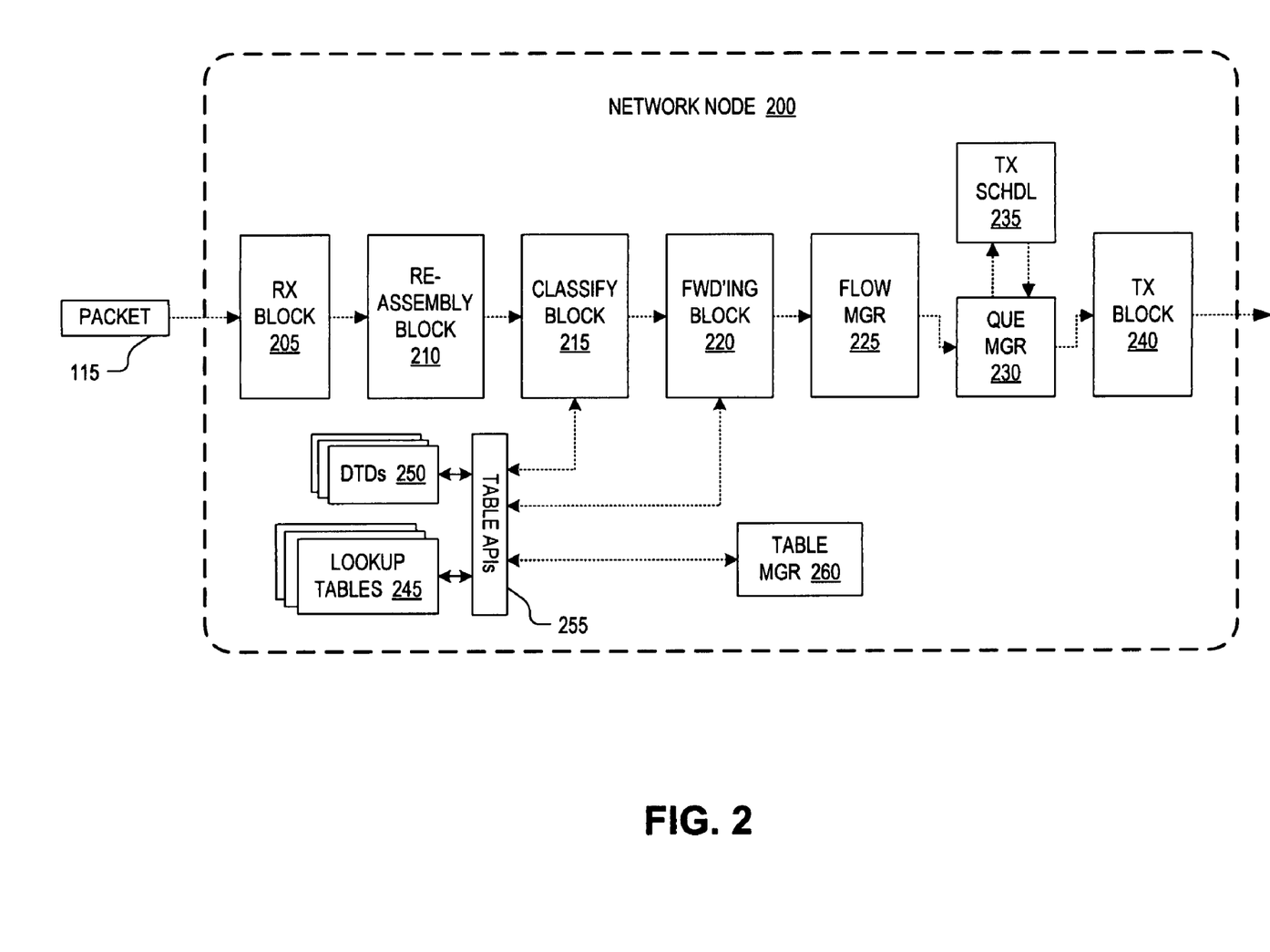
FIG. 2 is a functional block diagram illustrating the internal operation of a network node, in accordance with an embodiment of the invention.

FIG. 2 is a functional block diagram illustrating internal functional components of a network node 200, in accordance with an embodiment of the invention. Network node 200 is one possible embodiment of network nodes 105. Network node 200 may represent any network processing entity including, a switch, a router, a computer, a network processing unit, and the like. The illustrated embodiment of network node 200 includes a receive ("RX") block 205, a re-assembly block 210, a classify block 215, a forwarding block 220, a flow manager 225, a queue manager 230, a transmit ("TX") scheduler 235, a TX block 240, lookup tables 245, discrete table descriptors ("DTDs") 250, table application programming interfaces ("APIs") 255, and a table manager 260.

FIG. 2 represents one possible organization of data plane processing stages. A set of control plane processing stages (not illustrated) may interact with one or more of the illustrated data plane processing stages to receive, process, and transmit packets through network node 200. The functional blocks illustrated in FIG. 2 may be implemented in software and executed by micro-processors, implemented entirely in hardware, or some combination thereof. Furthermore, it should be appreciated that each illustrated functional block may be implemented by a single processing entity, multiple processing entities, or multiple functional blocks may be implemented by a single processing entity.

Receive block 205 is the initial stage that reads packets 115 from network 100, via a MAC or framer, or from a switch fabric. Receive block 205 temporarily stores packets 115 into a receive buffer. Often times packets 115 are segmented prior to transmission over network 100 into packet segments. Since packets typically are processed as a complete packet, and not segments, re-assembly block 210 reassembles the packet segments, stores them into memory (e.g., DRAM), and generates a packet descriptor for local processing. Classify block 215 is the stage where packets 115 are inspected to determine the action to be taken on the packet by assigning packets 115 to flows. Classification may be executed by inspecting subfields of packet 115 (e.g., source address field, destination address field, destination port field, source port field, protocol field, etc.) and using the values of these fields as an index key into classification tables (e.g., lookup tables 245) to retrieve a corresponding rule to apply to packet 115 (e.g., quality of service to apply, etc). After packets 115 are classified, forwarding block 220 may inspect the destination address to determine the next hop and corresponding output port through which packets 115 should be forwarded. In one embodiment, forwarding block 220 may use the destination address as an index key into routing tables (e.g., lookup tables 245) to retrieve a corresponding next hop and output port. Flow manager 225 may execute a variety of functions on packets 115 dependent upon the flow to which each packet 115 was assigned by classify block 215. For example, flow manager 225 may perform metering and statistics functions, congestion management, and the like.

During the receive processing stages, a packet is reassembled from several smaller segments, classified, then forwarded. Assuming it passes through the metering and congesting avoidance stages without being dropped, the packet is ready for transmit stage processing. Queue manager 230 organizes (e.g., enqueues) packets 115 into queues according to a transmit schedule generated by TX scheduler 235. When a queued packet 115 is ready for transmission according to the transmit schedule, queue manager 230 dequeues the packet and provides the packet descriptor to TX block 240. TX block 240 uses the packet descriptor to retrieve buffered packets 115 from memory and transmit them out of network node 200.

As previously mentioned, one or both of classify block 215 and forwarding block 220 may refer to lookup tables 245 to perform their respective functions. In one embodiment, table APIs 255 provide a unified and shared point of access to lookup tables 245. Tables APIs 255 publish a unified set of functions that may be shared by classify block 215, forwarding block 220, or other entities to access lookup tables 245. For example, some of these unified functions may include a seek, find, or lookup function, a create function, a modify function, or a delete function. Other more specialized functions may be generated for point-to-point flows, connection orientated flows, and the like.

In order to provide access to a variety of lookup tables 245 having a possible variety of sizes, formats, and locations in memory, table APIs 255 refer to DTDs 250. In one embodiment, each lookup table 245 has an associated DTD 250 to describe format, size, location, and other information about itself. Accordingly, in one embodiment there is a one-to-one relationship between lookup tables 245 and DTDs 250. DTDs 250 provide table APIs 255 with the information to tailor the unified functions to accommodate the differences between lookup tables 245.

In one embodiment, table APIs 255 are software functions that may be part of a modularized table management library. This library would provide the user with functionality to operate on different kinds of tables (e.g., lookup tables 245) through similar looking unified interfaces. With the help of DTDs 250, the table management library can be integrated into an operating system or a firmware subsystem running on a control processor of a network processor or other hardware system. With the functionality provided by table APIs 255 and DTDs 250, rather than having dedicated table management functions for each lookup table 245 (whose functions can be more or less similar in a network processing environment), lookup tables 245 can be used as parameters to these universal table management functions and generic operations (e.g., lookup, classify, modify, add, delete, etc.) can be performed on lookup tables 245 by interpreting DTDs 250 for each lookup table 245. Besides providing management functions for lookup tables 245, table APIs 255 may provide interfaces to manage and interpret DTDs 250 as well.

Conventionally, since lookup tables 245 may be designed by different developers for a variety of different purposes, the developers of lookup tables would also develop a unique set of functions tailored specifically for accessing each lookup table. However, not only does developing multiple unshared access functions for lookup tables incur redundant development costs, but the memory footprint consumed by these independent functions is wasteful.

Table manager 260 manages DTDs 250 and lookup tables 245. For example, when classify block 215 or forwarding block 220 modifies one of lookup tables 245, table manager 260 may update its corresponding DTD 250 to ensure the modification is reflected in the corresponding DTD 250. When a new lookup table 245 is created, table manager 260 is responsible for automatically creating a new corresponding DTD 250. Similarly, if one of lookup tables 245 is deleted, table manager 260 is responsible for deleting its corresponding DTD 250. In one embodiment, tables APIs 255 are incorporated within table manager 260 and classify block 215, forwarding block 220, or other entities access lookup tables 245 via the APIs published from table manager 260, itself. In this case, one of the important functions implemented by table manager 260 would be publishing the lookup function for finding entries within lookup tables 245 to a variety of client processes wishing to access lookup tables 245.

Although embodiments of the present invention are described primarily in relation to classification and forwarding as they related to network processing, it should be appreciated that implementation of DTDs 250 for accessing tables in different contexts and environments are contemplated. For example, tables may be used for accessing databases and therefore DTDs 250 may be generated for unified access to database tables.

Figure 3A:
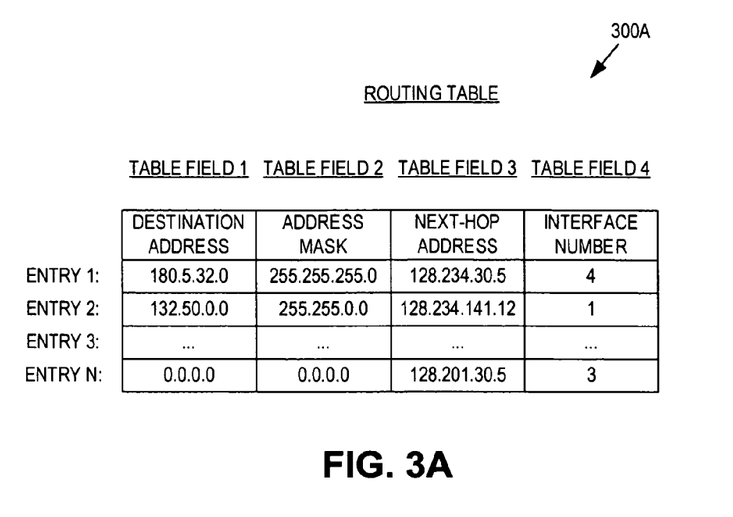
FIG. 3A illustrates a routing table, in accordance with an embodiment of the invention.
Figure 3B:
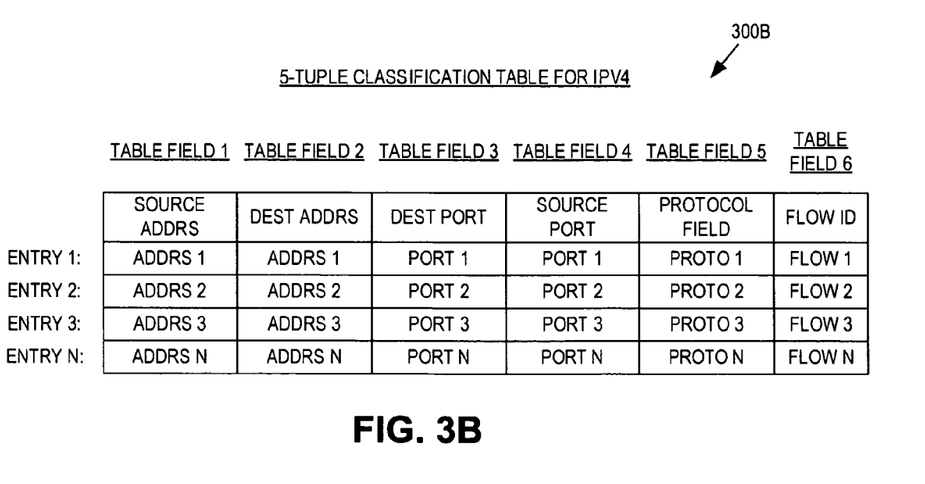
FIG. 3B illustrates a 5-tuple classification table, in accordance with an embodiment of the invention.

FIGS. 3A and 3B illustrate example lookup tables, in accordance with an embodiment of the invention. For example, FIG. 3A illustrates an example of an IPv4 routing table 300A to support datagram forwarding. FIG. 3B illustrates an example of a 5-tuple IPv4 classification table 300B to support packet classification.

As illustrated, routing table 300A includes four fields 1 to 4 (i.e., destination address, address mask, next-hop address, interface number) and may include any number of entries (i.e., entries 1 through N) with values populated in each of the fields 1 to 4. Routing table 300A is only one example of an IPv4 routing table. It should be appreciate that other routing tables (e.g., IPv6 routing table) may include more or less fields containing the same or different data with different byte sizes for each field. As previously mentioned, forwarding block 220 may index into routing table 300A to determine the next-hop and output interface/port number to forward packets 115 to their destinations. For example, forwarding block 220 may parse the destination address field of packets 115 and use this value to index into routing table 300A.

Classification table 300B illustrates an example 5-tuple classification table for IPv4. The typical quintuple or 5-tuple classification process is performed on TCP/IP packets using the IP source address, IP destination address, TCP source port number, TCP destination port number, and the protocol ID extracted from packets 115. Values for these packet fields may be extracted from packets 115 and used to index into classification table 300B to determine what flow (e.g., field 6) a packet belongs too. Of course, it should be appreciated that classification table 300B is merely intended for illustration and that other classification tables having different formats, fields, sizes, and numbers of entries may be used for classification purposes.

Figure 4:
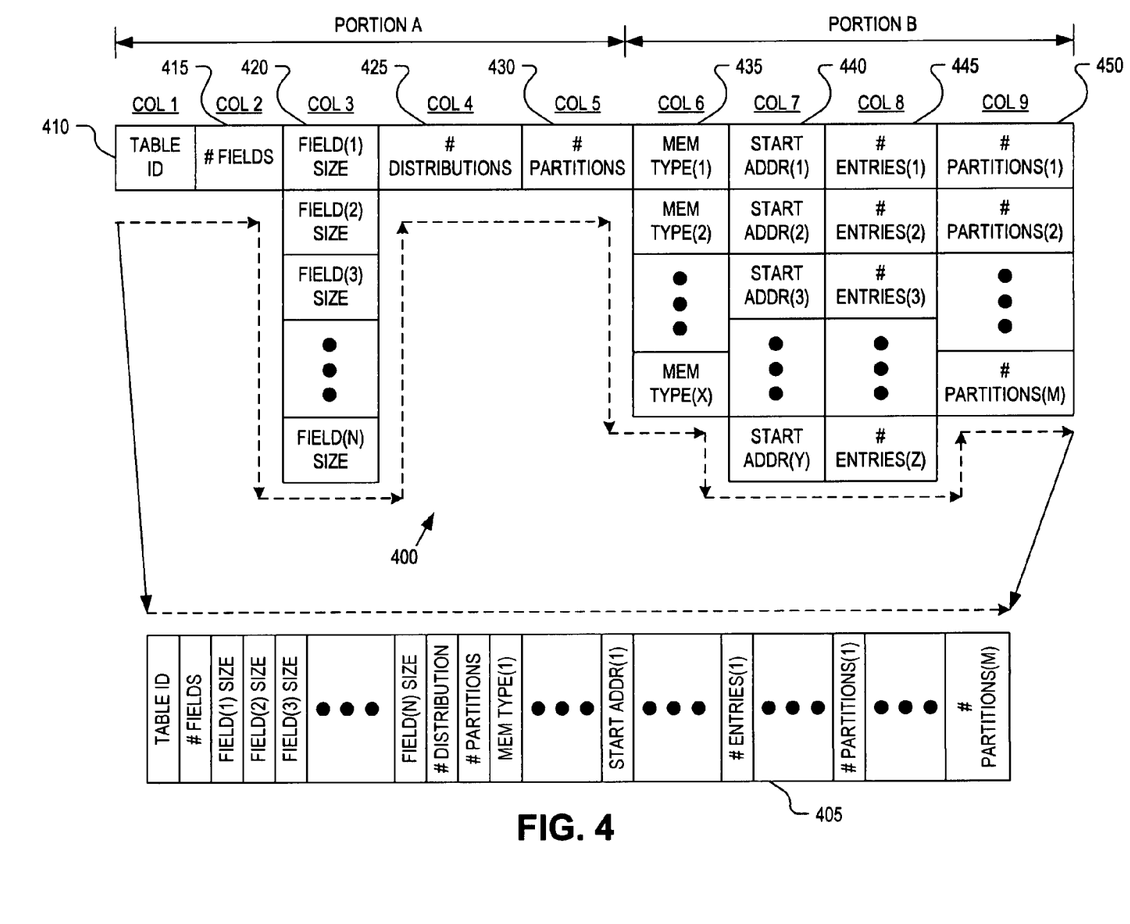
FIG. 4 illustrates a discrete table descriptor ("DTD"), in accordance with an embodiment of the invention.

FIG. 4 illustrates a DTD 400, in accordance with an embodiment of the invention. DTD 400 represents one possible embodiment of DTDs 250. The illustrated embodiment of DTD 400 includes a number of descriptor fields organized into nine columns 1-9. The descriptor fields of DTD 400 are organized into columns 1-9 for descriptive purposes, but in one embodiment actually reside in memory as a linear and contiguous memory structure 405. Therefore, columns 1-9 are merely intended to present a logical organization of the descriptor fields for the sake of discussion and illustration.

The illustrated embodiment of DTD 400 includes the following descriptor fields: a table identifier ("ID") field 410, a number of fields field 415, one or more field size fields 420, a number of distributions field 425, a number of partitions field 430, one or more memory type fields 435, one or more start address fields 440, one or more number of entries fields 445, and zero or more number of partitions fields 450. The descriptor fields can be further logically broken into two portions—portion A and portion B. Portion A includes information describing the format of a lookup table while portion B includes information describing the location or locations of the lookup table and its number of entries.

Descriptor field 410 includes information to identify and reference the corresponding lookup table of DTD 400 (e.g., one of lookup tables 300). Descriptor field 415 includes information to identify the number of table fields in the corresponding lookup table. For example, routing table 300A includes four table fields while classification table 300B includes six table fields. Descriptor fields 420 each describe the size (e.g., number of bits or bytes) of a corresponding table field. Accordingly, if descriptor field 415 identifies that the lookup table contains four table fields, then column 3 will include four descriptor fields 420 each identifying the respective size of each table field.

Figure 6:
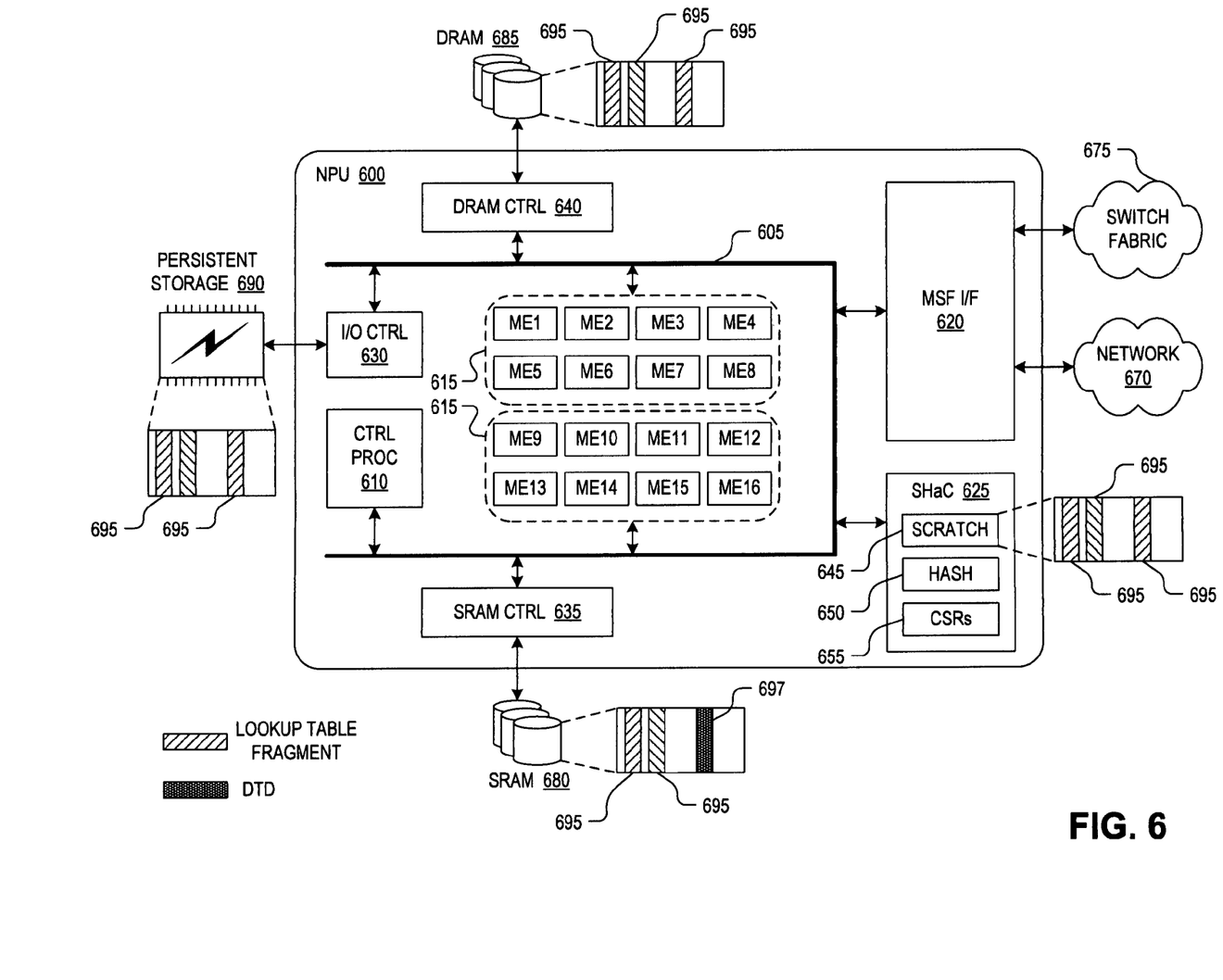
FIG. 6 is a block diagram illustrating a demonstrative network processing unit ("NPU") for implementing embodiments of the invention.

Descriptor field 425 includes information to identify the number of memory types over which the lookup table is distributed. In this context, the term "memory type" is used to connote a distinct memory unit. For example, dynamic random access memory ("DRAM") is one memory type while synchronous DRAM ("SDRAM") is another memory type. Descriptor field 430 includes information to identify whether the lookup table is stored in multiple discontinuous memory partitions within a single memory type, and in some cases discloses the actual number of discontinuous memory partitions. Accordingly, descriptor fields 425 and 430 enable DTD 400 to track portions (or entries) of a single lookup table that are distributed across multiple different memory types and even discontinuously stored in multiple partitions within a single memory type. This is illustrated in FIG. 6 where lookup table fragments 695 of a single lookup table are illustrated as being simultaneously stored in DRAM 685, SRAM 680, persistent storage 690, and scratch memory 645.

Descriptor fields 435 identify the actual memory types themselves in which the lookup table is distributed. In one embodiment, if descriptor field 425 identifies only one distribution, then column 6 will only include one descriptor field 435 identifying the single memory type. The number of descriptor fields 435 present in column 6 corresponds to the number of distributions identified in descriptor field 425. Descriptor fields 440 list the start address of each contiguous portion of the lookup table in the one or more memory types. Accordingly, if descriptor field 430 identifies multiple discontinuous partitions for the lookup table, while descriptor 425 identifies that the lookup table is located in only a single memory, then column 7 will list one start address for each memory partition identified in descriptor field 430. Descriptor fields 445 list the number of table entries extending from each start address listed in column 7.

Finally, descriptor fields 450 listed in column 9 are present in a special scenario, and otherwise not included in DTD 400. In the special scenario where descriptor field 425 identifies multiple distributions and descriptor field 430 identifies multiple partitions, then additional descriptor fields 450, illustrated in column 9, are added to DTD 400. Descriptor fields 450 identify the number of discontinuous memory partitions within each memory type identified in descriptor fields 435 of column 6. Accordingly, for each memory type listed in column 6 there will be a corresponding number of partitions listed in column 9.

Figure 5A:
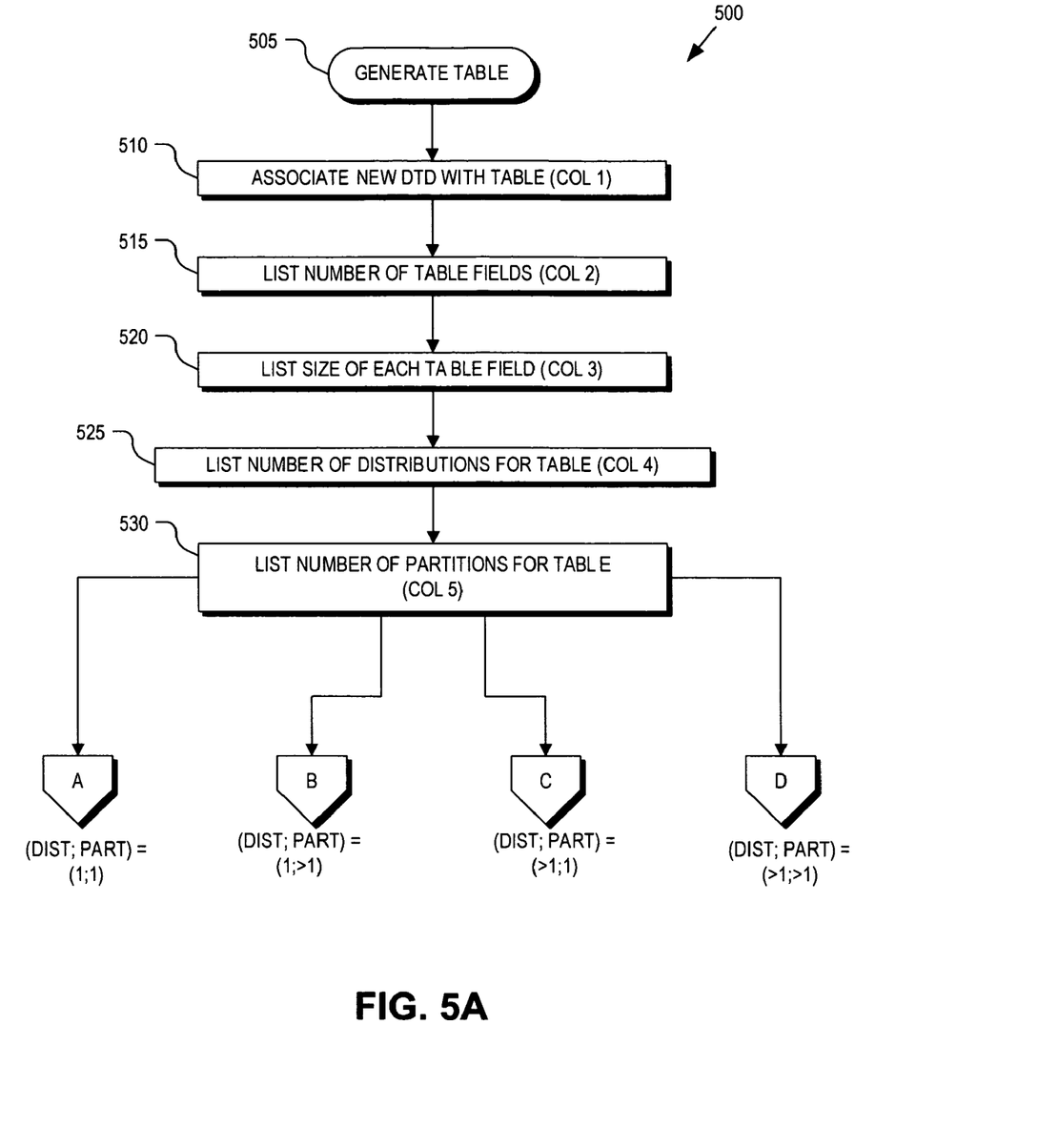
FIG. 5A is a flow chart illustrating a first portion of a process for generating a DTD, in accordance with an embodiment of the invention.
Figure 5B:
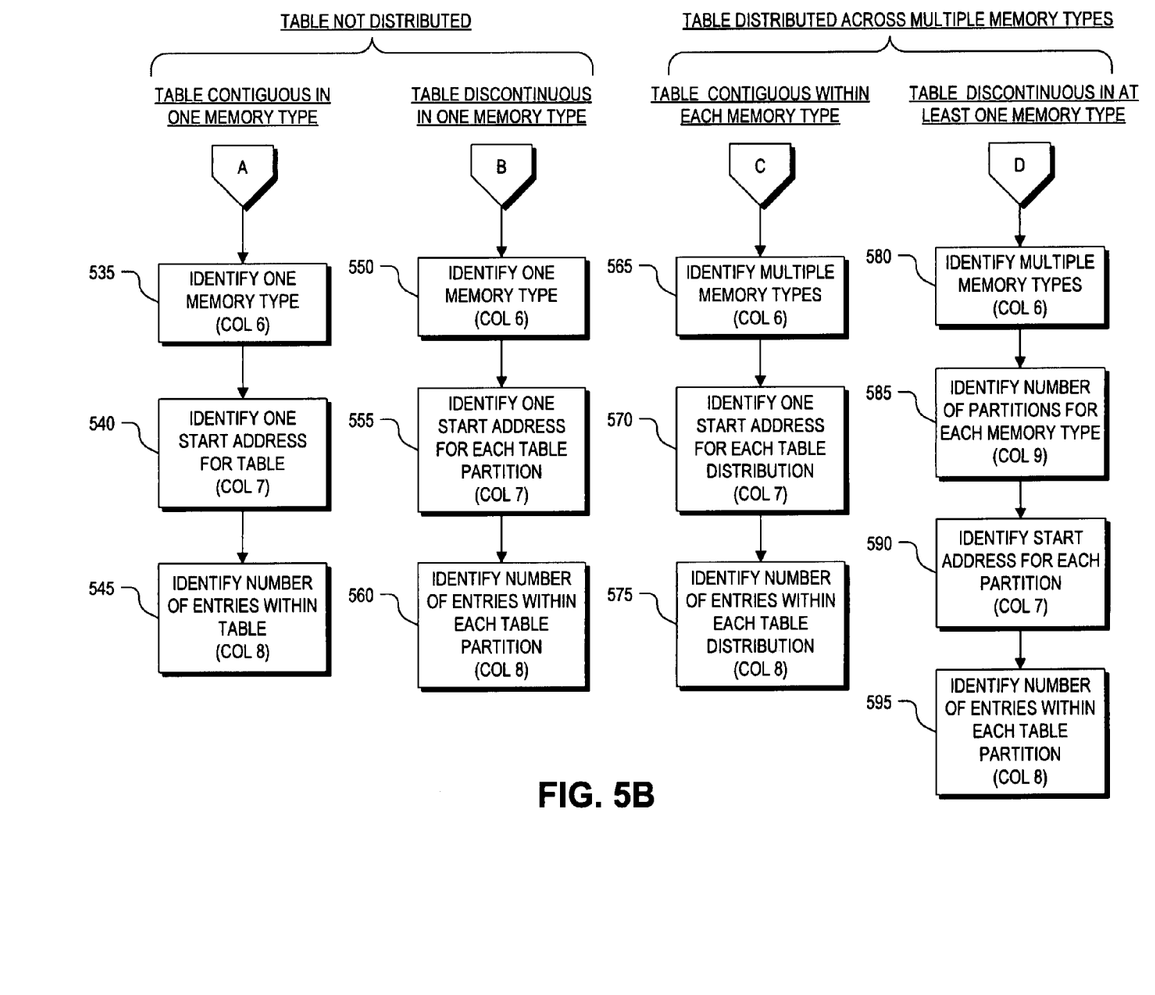
FIG. 5B is a flow chart illustrating a second portion of the process for generating a DTD, in accordance with an embodiment of the invention.

FIGS. 5A and 5B include flow charts illustrating a process 500 for generating DTD 400, in accordance with an embodiment of the invention. The order in which some or all of the process blocks appear in each process should not be deemed limiting. Rather, one of ordinary skill in the art having the benefit of the present disclosure will understand that some of the process blocks may be executed in a variety of orders not illustrated.

In a process block 505, a table is generated (e.g., one of lookup tables 245) and populated with entries. The table maybe created and the various entries stored in a single memory type as one contiguous block of memory, in a single memory type but located in multiple discontinuous memory partitions of the single memory type, distributed across multiple memory types but stored as a single contiguous memory partition within each memory type, or distributed across multiple memory types and stored in multiple discontinuously memory partitions of one or more of the memory types. Accordingly, embodiments of the invention provide flexibility in where and how the entries of a single table are stored.

In a process block 510, a new DTD 400 is created and associated with the new table. The DTD 400 is associated with the newly created table by populating descriptor field 410 (column 1) with a table ID identifying the newly created table. In a process block 515, the number of table fields within the newly created table is written into descriptor field 415 (column 2). Referring to FIGS. 3A and 3B as examples, if DTD 400 corresponded to routing table 300A, then descriptor field 415 would be populated with a value indicating four table fields. If DTD 400 corresponded to classification table 300B, then descriptor field 415 would be populated with a value indicating six table fields.

In a process block 520, descriptor fields 420 (column 3) are populated with values indicating the size of each table field of the newly created table. Accordingly, if descriptor field 415 identifies four table fields, then there will be four descriptor fields 420, each identifying the size of a corresponding table field. The values populated into descriptor fields 420 may identify the size of the corresponding table field in bits, bytes, words, long words, or some other incremental value.

In a process block 525, descriptor field 425 (column 4) is populated with a value identifying the number of distributions for the table. As discussed above, DTD 400 enables a single lookup table to be distributed across multiple different memory types (e.g., SRAM, DRAM, flash, hard disk, etc.). For example, if a single table were partially stored in SRAM and partially stored in DRAM, then descriptor field 425 would be populated with a value indicating two distributions.

In a process block 530, descriptor field 430 (column 5) is populated with a value identifying whether the table is currently stored in a single partition or multiple partitions. In some scenarios (described in detail below) the value populated in descriptor 430, not only identifies whether the table is stored in multiple partitions, but also identifies the number of partitions over which the table is spread.

As illustrated in the embodiment of process 500, the values populated into descriptor fields 425 and 430 can lead to four alternatives. Alternative 'A' includes a table that is neither distributed nor partitioned. In other words, the table is located in a single memory type within a single contiguous partition of memory. Alternative 'A' is identified by (# of distributions; # of partitions)=(1;1). In a process block 535 (see FIG. 5B), the single memory type in which the table is located is identified in descriptor field 435 (column 6). Since alternative 'A' only includes one memory type, only a single descriptor field 435 is populated in column 6. In a process block 540, the start address of the table is identified in descriptor field 440 (column 7). Since alternative 'A' only include one partition, only a single descriptor field 440 is populated in column 7. In a process block 545, the number of entries in the table is identified in descriptor field 445. Again, since alternative 'A' only includes one partition, only a single descriptor field 445 is populated with a number of entries value in column 8.

Alternative 'B' includes a table that is not distributed over multiple memory types, but is located in multiple, discontinuous partitions within a single memory type. Alternative 'B' is identified by (# of distributions; # of partitions)=(1;>1). In alternative 'B', descriptor field 430 (column 5) identifies the number of partitions in which entries of the table are stored. Accordingly, the number of descriptor fields 440 and 445 in columns 7 and 8, respectively, will equal the number of partitions identified in descriptor field 430. In a process block 550, the single memory type in which the table is located is identified in descriptor field 435 (column 6). In a process block 555, the start address of each portion of the table located in a different memory partition identified in descriptor field 430 is identified in corresponding descriptor fields 440 of column 7. In a process block 560, the number of entries in each table portion is identified in descriptor fields 445 (column 8). Accordingly, there is one descriptor field 445 listing a number of entries for each start address identified in descriptor fields 440. In alternative 'B', there is a one-to-one correspondence between descriptor fields 445 in column 8 and descriptor fields 440 in column 7.

Alternative 'C' includes a table that is distributed over multiple memory types, but is located in only a single contiguous partition within each memory type. Alternative 'C' is identified by (# of distributions; # of partitions)=(>1;1). In alternative 'C', descriptor field 425 (column 4) identifies the number of distributions or memory types over which the table is distributed. Accordingly, the number of descriptor fields 435 in column 6, will equal the number of distributions identified in descriptor field 425. In a process block 565, each of the memory types over which the table is distributed is identified in descriptor fields 435 (column 6). In a process block 570, the start address of each distribution of the table located in a different memory type is identified in corresponding descriptor fields 440 of column 7. In a process block 575, the number of entries in each table distribution is identified in descriptor fields 445 (column 8). Again, in alternative 'C', there is a one-to-one correspondence between descriptor fields 445 in column 8 and descriptor fields 440 in column 7.

Alternative 'D' is a special case which includes a table that is distributed over multiple memory types and includes one or more distributions having multiple discontinuous memory partitions. In the special case of alternative 'D', the number of partitions identified in descriptor field 430 (column 5) need not identify the actual total number of partition for the table (though it can). Rather, it can simply list a value greater than one. In alternative 'D', the value listed in descriptor field 430 may merely be used to interpret and identify existence of the special case of alternative 'D'. Alternative 'D' is identified by (# of distributions; # of partitions)=(>1;>1). In alternative 'D', additional descriptor fields 450 (column 9) are used.

In a process block 580, each of the memory types over which the table is distributed is identified in descriptor fields 435 (column 6). In a process block 585, the number of partitions within each memory type identified in column 6, are listed in corresponding descriptor fields 450. In one embodiment of alternative 'D', there is a one-to-one correspondence between descriptor fields 435 (column 6) and descriptor fields 450 (column 9). Accordingly, a particular memory type identified in column 6 may only store a single contiguous memory partition, in which case, a corresponding descriptor field 450 (column 9) will list only one partition. However, other memory types identified in column 6 may include multiple discontinuous memory partitions, in which case, corresponding descriptor fields 450 (column 9) will list the number of memory partitions for each memory type.

In a process block 590, the start address of each partition of the table identified in descriptor fields 450 (column 9) is identified in a corresponding descriptor field 440 (column 7). Accordingly, if the descriptor field 450 labeled "# partitions (1)" identifies three partitions within the memory type identified in descriptor field 435 labeled "mem type(1)", then column 7 would include three descriptor fields 440 (e.g., start addr(1), start addr(2), and start addr (3)) each listing a start address for a respective memory partition. Similarly, if descriptor field 450 labeled "# partitions(2)" identifies two partitions within the memory type identified in descriptor field 435 labeled "mem type(2)", then column7 would include two additional descriptor fields 440 (e.g., start addr(4) and start addr(5)) each listing a start address for a respective memory partition.

In a process block 595, the number of table entries currently stored in each partition having an associated start address identified in column 7, is identified in descriptor fields 445 (column 8). Again, in alternative 'D', there is a one-to-one correspondence between descriptor fields 445 in column 8 and descriptor fields 440 in column 7. FIG. 7 illustrates a table that summarizes possible values within the descriptor fields of DTD 400 and their respective interpretations, according to one embodiment of the invention.

Once the various descriptor fields of DTD 400 are populated, DTD 400 can be referenced to gain access to a distributed and partitioned lookup table. Furthermore, as entries are added, deleted, or modified, DTD 400 may be updated by table manager 260 to reflect the changes, allocated new memory, release unused memory, or otherwise.

FIG. 6 is a block diagram illustrating a demonstrative network processing unit ("NPU") 600 for implementing embodiments of the invention. NPU 600 is one possible embodiment of a NPU that may be incorporated in network nodes 115 and/or may execute the processing stages illustrated in FIG. 2. The illustrated embodiment of NPU 600 includes a mutli-interconnect 605, a control processor 610, two clusters of microengines 615 (e.g., MEs 1 to 16), a media and switch fabric ("MSF") interface 620, a SHaC unit 625, an input/output ("I/O") controller 630, an SRAM controller 635, and a DRAM controller 640. SHaC unit 625 includes scratch memory 645, a hash unit 650, and control and status registers ("CSRs") 655.

The components of NPU interoperate as follows. Multi-interconnect 605 may include multiple, independent internal buses for interconnecting the various subcomponents of NPU 600. Microengines 615 are multithreaded and provide the parallel processing power to process packets 115 at line rates. In one embodiment, a different one of microengines 615 may be assigned to execute each of the processing stages illustrated in FIG. 2. Control processor 610 managers the control plane of NPU 600 where it processes exception packets, executes chip configuration and control, manages routing tables (e.g., routing table 300A), and runs signaling stacks. Control processor 610 may also perform various data plane tasks, such as, terminating TCP/IP, setting up network address translation, establishing IP Security ("IPSec") connections, or the like. In one embodiment, control processor 610 is responsible for executing table manager 260 to create, update, or modify DTDs 250.

MSF interface 620 connects to multi-interconnect 605 and provides the primary interface for transferring packets 115 in/out of NPU 600. MSF interface 620 may include one or more interfaces (e.g., industry standard interfaces such as UTOPIA, SPI-3, SPI-4.2, or the like) to connect to network 670 (e.g., local area network, wide area network, Internet, etc.). MSF interface 620 may also include one or more interfaces (e.g., SPI, CSIX, or the like) for coupling to a switch fabric 675. Since MSF interface 620 is located between the primary packet processing engines, microengiens 615, and network 670 and switch fabric 675, MSF interface 620 may include memory to buffer inbound and outbound packets 115.

SRAM controller 635 couples multi-interconnect 605 to SRAM 680. SRAM controller 630 provides a high speed, low latency connection to SRAM 680. SRAM 680 may typically be used for storing lookup tables 245, DTDs 250, buffer descriptors, free buffer lists, and the like. DRAM controller 640 couples multi-interconnect 605 to DRAM 685. Since DRAM is typically less expensive and lower speed than SRAM, DRAM 685 may be used as the bulk storage for buffering packets 115 while their descriptors are processed by microengines 615. DRAM 685 may also be used to store routing tables 245 and flow descriptors. I/O controller 630 may couple multi-interconnect 605 to a variety of external devices/media, such as a persistent storage device 690 (e.g., flash memory, disk drive, network drive, etc.). In one embodiment, I/O controller 630 is a peripheral component interconnect ("PCI") interface.

The illustrated embodiment of SHaC unit 620 includes scratch memory 645, a hash unit 650, and CSRs 655. In one embodiment, scratch memory 645 contains 16 kbytes of memory often used for microengine-to-microengine communication and local data storage. Hash unit 650 may execute 48-bit, 64-bit, or 128-bit hash calculations to support hash table lookup functions. In one embodiment, CSRs 655 include the bulk of the chip wide control and status registers for NPU 600.

As illustrated, a lookup table (e.g., one of lookup tables 245, 300A, or 300B) may be split up into fragments 695, which are stored in one or more memories including SRAM 680, DRAM 685, persistent storage 690, scratch memory 645, or otherwise. Furthermore, lookup table fragments 695 may be stored in one or more discontinuous memory partitions within a single memory device. The corresponding DTD 697 may be stored in a single memory device (e.g., SRAM 680) where it may be referenced by table APIs 255, table manager 260, classify block 215, forwarding block 220, or other entities to gain access to the distributed and partitioned fragments 695 of the lookup table.

DTD 697 provides a single reference point in memory to determine the format and location of its corresponding lookup table. DTD 697 also enables flexibility, not only to store its corresponding lookup table in anyone of the memories listed above, but also to distribute a single lookup table across multiple memory types (e.g., SRAM 680, DRAM 685, persistent storage 690, scratch memory 645, etc.). Furthermore, since DTD 697 supports the addition of memory partitions to a lookup table, a minimum base amount of memory can be pre-allocated to a lookup table, and then subsequent memory partitions added to the lookup table as entries are added to the lookup table and additional memory consumed. Since DTD 697 includes a mechanism to describe the locations of discontinuous memory partitions, the additional memory fragments added to the lookup table need not be contiguous with the initial pre-allocated memory. This ability to allocate and release memory for lookup tables 245 on an "as needed basis", enables a memory management technique reducing the need to wastefully pre-allocate large blocks of memory, which may or may not be used.

As entries are added, deleted, or modified within the lookup table, its corresponding DTD 697 can be updated in real-time to reflect the changes. If lookup table fragments 695 are moved from one memory type to another during operation of NPU 600, their movements can be tracked simply by updating DTD 697 in real-time. This ability to track the movement of lookup table fragments 695 from one memory type to another enables a sort of high speed caching mechanism where the most commonly access entries within a table are kept in higher speed (bandwidth), lower latency memories (e.g., SRAM 680 or scratch memory 645), while the less frequently accessed entries of the lookup table are pushed out to the slower speed, higher latency memories (e.g., DRAM 685, persistent storage 690).

The processes explained above are described in terms of computer software and hardware. The techniques described may constitute machine-executable instructions embodied within a machine (e.g., computer) readable medium, that when executed by a machine will cause the machine to perform the operations described. Additionally, the processes may be embodied within hardware, such as an application specific integrated circuit ("ASIC") or the like.

A machine-accessible medium includes any mechanism that provides (i.e., stores and/or transmits) information in a form accessible by a machine (e.g., a computer, network device, personal digital assistant, manufacturing tool, any device with a set of one or more processors, etc.). For example, a machine-accessible medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method implemented by a network processor, the method comprising:
    identifying, by the network processor, information about a table by referencing a first portion of a table descriptor associated with the table;
    identifying, by the network processor, two or more locations of the table in memory by referencing a second portion of the table descriptor, wherein one location of the table is discontinuous from another location of the table;
    providing access to the table based on the information and the two or more locations identified in the table descriptor, wherein a format of the table descriptor is shared by a plurality of table descriptors to provide access to a corresponding plurality of tables in the memory;
    providing information about and locations of the plurality of tables in the corresponding plurality of table descriptors, wherein at least one of the tables is distributed across multiple different memory types; and
    publishing a set of application programming interfaces ("APIs") to provide access to the tables based on the table descriptors,
    wherein the tables comprise lookup tables for Internet Protocol ("IP") routing or packet classification within a network node and wherein the APIs are shared by a packet classify block and a packet forwarding block to provide access to the tables.

2. The method of claim 1, wherein identifying information about the table by referencing the first portion of the table descriptor includes:
    identifying the table by referencing a first descriptor field of the table descriptor;
    identifying a number of table fields within the table by referencing a second descriptor field of the table descriptor; and
    identifying a field size of each table field by referencing a set of third descriptor fields of the table descriptor.

3. The method of claim 1, wherein identifying information about the table by referencing the first portion of the table descriptor includes:
    identifying a number of memory types over which the table is distributed by referencing a distribution field of the table descriptor.

4. The method of claim 3, wherein identifying information about the table by referencing the first portion of the table descriptor further includes:
    identifying whether the table is located in multiple memory partitions by referencing a partition field of the table descriptor.

5. The method of claim 4, wherein if the distribution field identifies that the table is located within a single memory type, then identifying two or more locations of the table in the memory within the second portion of the table descriptor includes:
    identifying the single memory type in which the table is located by referencing a memory type field of the table descriptor;
    identifying a start address for each memory partition of the table located in the single memory type by referencing two or more start address fields of the table descriptor; and
    identifying a number of entries within the table for each memory partition by referencing two or more entries fields of the table descriptor, wherein a number of the entries fields corresponds to a number of the start address fields.

6. The method of claim 1, wherein a distribution field of a second table descriptor identifies that a second table is distributed across multiple memory types and a partition field of the second table descriptor identifies that the second table is located within a single contiguous partition within each of the multiple memory types, wherein identifying one or more locations of the second table in the memory within a second portion of the second table descriptor includes:
    identifying each of the multiple memory types within memory type fields of the second table descriptor;
    identifying a start address for the second table in each of the memory types within start address fields of the second table descriptor; and
    identifying a number of entries of the second table stored in each of the memory types within entries fields of the second table descriptor.

7. The method of claim 4, wherein if the distribution field identifies that the table is distributed across multiple memory types and the partition field identifies that the table is located in multiple discontinuous memory partitions of at least one of the multiple memory types, then identifying two or more locations of the table in the memory by referencing the second portion of the table descriptor includes:

identifying each of the multiple memory types within memory type fields of the table descriptor;

identifying a number of memory partitions within each of the multiple memory types in second partition fields of the table descriptor;

identifying a start address of the table for each of the memory partitions in each of the memory types within start address fields of the table descriptor; and identifying a number of entries within the table for each of the memory partitions in each of the memory types within entries fields of the table descriptor.

8. The method of claim 1 wherein the APIs include at least one of:

a create API for creating new tables;
a seek API for looking up entries within the tables;
a modify API for modifying entries within the tables; and
a delete API for deleting entries within the tables.

9. A machine-accessible medium that provides instructions that, if executed by a machine, will cause the machine to perform operations comprising:

generating a table;

generating a table descriptor including a first portion identifying information about the table and a second portion identifying one or more locations of the table;

publishing an application programming interface ("API") to provide access to the table based on the table descriptor;

allocating additional memory for the table, wherein allocating the additional memory for the table includes allocating an additional partition discontinuous from an existing partition within memory;

adding a new entry to the table residing in the additional memory allocated; and updating the table descriptor to reflect the new entry.

10. The machine-accessible medium of claim 9, wherein generating the table descriptor including the first portion identifying information about the table includes:

generating a distribution field within the first portion identifying a number of memory types over which the table is distributed; and generating a partition field within the first portion identifying whether the table is located in multiple memory partitions of at least one memory type.

11. The machine-accessible medium of claim 10, further providing instructions that, if executed by the machine, will cause the machine to perform further operations, comprising:

distributing the table across multiple different types of memory.

12. The machine-accessible medium of claim 11, further providing instructions that, if executed by the machine, will cause the machine to perform further operations, comprising:

placing a first portion of entries of the table into a first one of the multiple different types of memory providing a first access latency; and placing a second portion of the entries of the table less commonly accessed than the first portion of the entries into a second one of the multiple different types of memory having a higher access latency than the first access latency.

13. The machine-accessible medium of claim 9, further providing instructions that, if executed by the machine, will cause the machine to perform further operations, comprising:

generating a plurality of lookup tables;

generating a corresponding plurality of table descriptors for the lookup tables; and sharing the published API to provide access to all of the lookup tables, wherein the API references each of the table descriptors to provide access to each of the lookup tables.

14. A system, comprising:

one or more processors;

synchronous dynamic random access memory ("SDRAM") coupled to the processor;

a second memory coupled to the processor, wherein the second memory is different than the SDRAM; and a persistent memory unit communicatively coupled to the processor, wherein the persistent memory unit provides instructions that, if executed by the one or more processors, will cause the one or more processors to perform operations comprising:

generating a lookup table;

distributing a first portion of the lookup table in the SDRAM and a second portion of the lookup table in the second memory;

generating a discrete table descriptor ("DTD") including a first portion including information about the lookup table and a second portion identifying one or more locations of the lookup table; and publishing an application programming interface ("API") to provide access to the lookup table based on the DTD.

15. The system of claim 14, wherein the second portion of the DTD includes:

memory type fields identifying the SDRAM and the second memory, respectively;

start address fields identifying start addresses of the first and second portions of the lookup table in the SDRAM and the second memory, respectively; and entries fields identifying a number of entries of the lookup table located in the SDRAM and the second memory.

16. The system of claim 14, wherein the persistent memory unit further provides instructions that, if executed by the one or more processors, will cause the one or more processors to perform further operation comprising:

placing commonly accessed entries of the lookup table in the SDRAM; and placing less commonly accessed entries of the lookup table in the second memory.

17. The system of claim 14, wherein the persistent memory unit further provides instructions that, if executed by the one or more processors, will cause the one or more processors to perform further operation comprising:

generating a plurality of lookup tables;
generating DTDs for each of the lookup tables; and
providing a set of APIs to provide access to the lookup tables with reference to the DTDs.

* * * * *